United States Patent [19]

Brewer

[11] 4,290,311
[45] Sep. 22, 1981

[54] DILATOMETER

[75] Inventor: Given A. Brewer, Marion, Mass.

[73] Assignee: The United States of America as represented by the United States Department of Energy, Washington, D.C.

[21] Appl. No.: 119,709

[22] Filed: Feb. 8, 1980

[51] Int. Cl.³ .............................................. G01L 7/02
[52] U.S. Cl. .................................... 73/730; 73/119 A
[58] Field of Search ................. 73/730, 119 A, 141 A, 73/753

[56] References Cited

U.S. PATENT DOCUMENTS

| 3,535,937 | 10/1970 | Wiggins et al. | 73/730 |
| 3,698,248 | 10/1972 | Vasek | 73/730 |
| 3,698,249 | 10/1972 | Weaver | 73/730 |
| 3,750,475 | 8/1973 | Weaver | 73/730 |
| 3,866,473 | 2/1975 | Teitelbaum | 73/730 |

Primary Examiner—Donald O. Woodiel
Attorney, Agent, or Firm—Robert Southworth, III; Richard E. Constant; Richard G. Besha

[57] ABSTRACT

A dilatometer mountable to the exterior surface of pressurized pipe to measure small pressure variations within the pipe. The dilatometer includes two rigid beams tied together by nonextensible tensile members on opposite sides of the pipe. One member includes a strain gauge mounted to a strain gauge plate. Dilation of the pipe distends the beams, stressing the gauge plate. The strain is physically magnified on the gauge plate due to its position at the end of the beams and in direct proportion to overall diametral variation of the pipe due to pressure fluctuations.

15 Claims, 4 Drawing Figures

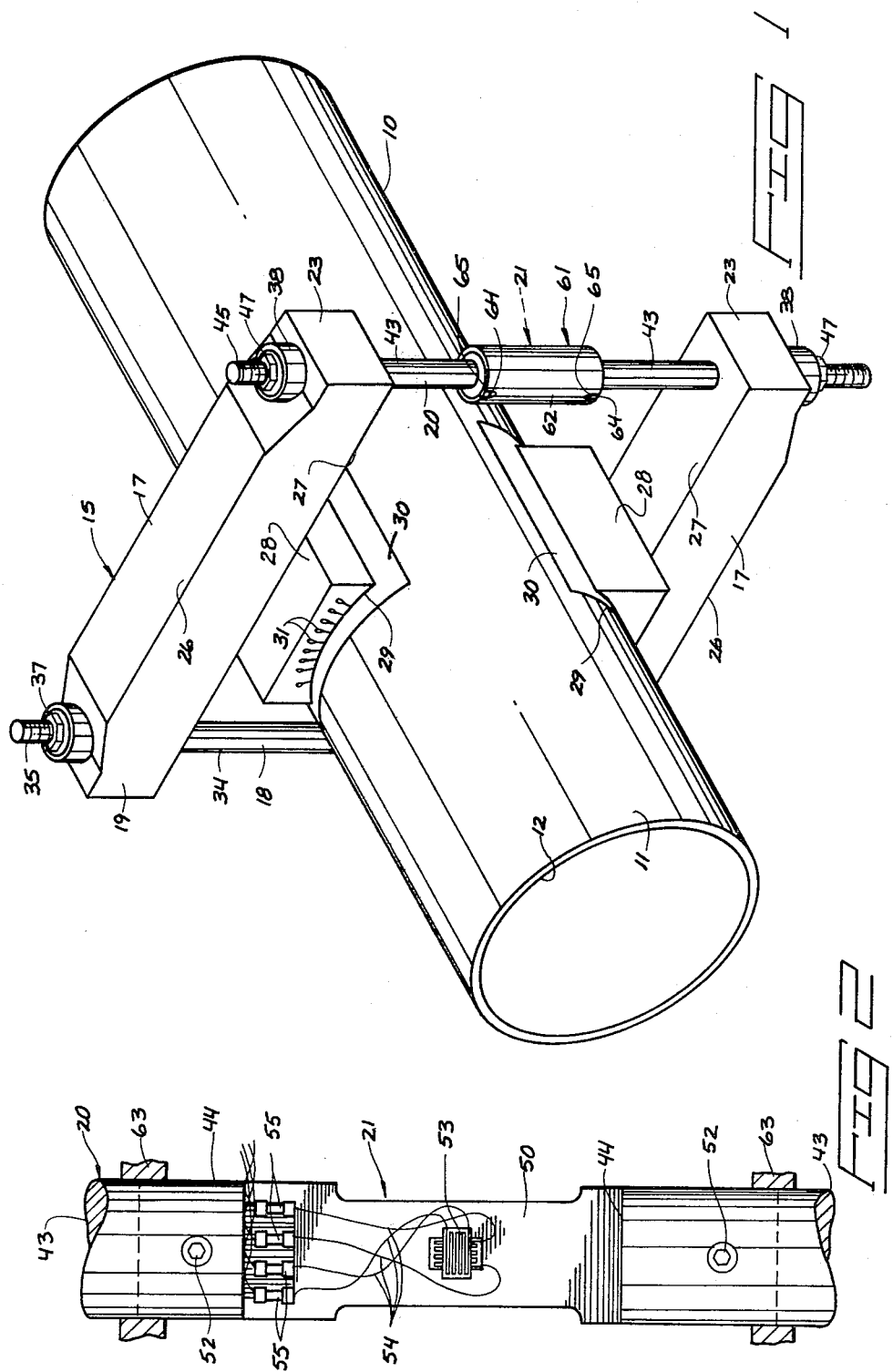

DILATOMETER

BACKGROUND OF THE INVENTION

The present invention is related to external pipe or vessel dilation sensing apparatus and more particularly to such apparatus for measuring pressure differential through detection of strain on the external circumferential surface of the pipe or vessel.

It is desirable, particularly in the nuclear power and testing industry as well as other industries, to monitor low level pressure fluctuations within fluid conduits. Pressure monitoring can be accomplished from within the conduit by standard measuring techniques. However, such techniques require that there be access to the interior of the conduit. Safety factors, shut down time required to install or maintain standard measuring equipment, strength reduction of the conduit walls and the caustic or toxic nature of the conduit contents are all valid reasons for not using internal pressure monitoring in otherwise closed systems. The present apparautus provides accurate pressure monitoring while assuring the system integrity.

The usual technique used to externally monitor pressure fluctuations within a conduit involves mounting one or more electrically resistive strain gauges on the external surface of the conduit. Expansion of the surface due to pressure fluctuations changes the electrical resistance through the strain gauges. Measurements of the change in resistance can easily be related to the strain and to the internal pressure causing the strain. This technique is serviceable and widely used where monitoring of relatively large pressure fluctuations is desired. However, a strain gauge measures only the strain at the point of contact between itself and the pipe circumference. Low pressure variations cause such insignificant changes in the resistance of the gauge as to defy accurate measurement. A problem is thus encountered when it is desirable to measure small pressure variations, say in the range of 3 psi. In addition, it may not be possible to use conventionally attached strain gauges on piping that has a temperature in excess of 500° F.

The present apparatus overcomes this shortcoming by use of two rigid beams clamped across the external conduit diameter and supporting a sensitive strain gauge between them at one side of the conduit. The beams are fixed spatially at the opposite conduit side. The beam lengths mechanically magnify any diametric size variations in the conduit, as detected by the strain gauge.

SUMMARY OF THE INVENTION

An apparatus is described for measuring diametral dilation of cylindrical pipe by engaging opposite sides of the pipe with two rigid beams. The beams are tied together at their ends by nonextensible tensile means. A strain sensing means is connected between ends of one tensile means, which is prestressed so a preload is placed on the strain sensing means. Measurement of diametral dilation of the pipe can be made from measuring strain variations from the preload condition.

A first object of the present invention is to provide a device for measuring total diametral dilation of a pipe without damaging or physically changing the integrity of the pipe walls.

Another object is to provide such a device that will accurately measure diametral dilation of a pipe from outside the confines of the pipe wall.

A further object is to provide such a device that will allow accurate measurement of pipe dilation using standard strain gauges.

A still further object is to provide such a device that is removable and reusable on other pipes of similar diameter. These and still further objects and advantages will become apparent upon reading the following specification which, taken with the accompanying drawings, describe a preferred form of the present invention.

BRIEF DESCRIPTION OF THE DRAWINGS

FIG. 1 is a pictorial view of the present dilatometer shown mounted to a short section of pipe;

FIG. 2 is an enlarged fragmentary view illustrating the strain sensing means of the present invention;

DETAILED DESCRIPTION OF A PREFERRED EMBODIMENT

A short section of pipe is shown at 10 in the accompanying drawings. The present invention is intended for use on such pipe 10 that is arranged in a closed system to contain and direct flow of a pressurized fluid. For purposes of further description, the pipe 10 includes a cylindrical exterior surface 11 and inwardly spaced interior wall 12. The pipe diameter may vary since the present apparatus can be readily adapted to accomodate pipes or other vessels of larger or smaller diameter.

Figure 3:
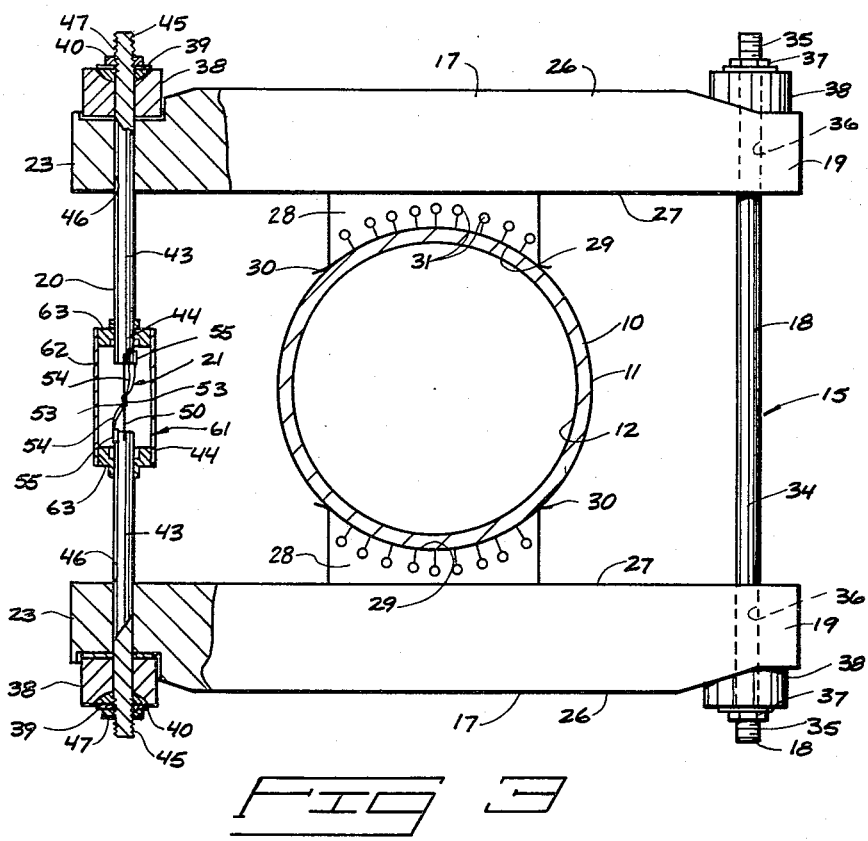
FIG. 3 is an elevational view with portions broken away to illustrate functioning of the strain sensing means.

The present dilatometer is generally designated in the drawings by the reference character 15. As shown in FIGS. 1 and 3, the dilatometer 15 is used externally of the pipe. Its purpose is to provide reasable output that can be correlated to very low pressure fluctuations within the adjacent pipe.

The dilatometer 15 is comprised of a pair of rigid beams 17. A first nonextensible tensile member 18 ties rearward ends 19 of the beams 17 against the pipe. A second nonextensible tensile member 20 extends from opposite ends of a strain sensing means 21 to tie forward ends 23 of the beams together, thereby sandwiching the pipe firmly between the beams. The tensile members 18 and 19 can be placed under tensile stress against the beam ends to preload the beams against the pipe and to prestress the strain sensing means 21. Dilation of the pipe will therefore be sensed by the strain sensing means 21 along the second nonextensible tensile member 20.

The beams 17 shown are identical and formed of solid, rigid metal. Each beam includes an outwardly facing surface 26 in relation to the pipe 10 and an inwardly facing surface 27. It is preferred that these surfaces be arranged on the pipe in a horizontal orientation.

Each of the beams includes a central rigid foot 28 extending inwardly from its surface 27. The feet are centrally located along the lengths of the beams and include transverse arcuate surfaces 29 that are formed complementary to the transverse arcuate curvature of the pipe 10. Surfaces 29 will therefore conform closely to the adjacent surfaces of the pipe 10.

Shims 30, preferably formed of a heat insulative material such as asbestos, may be used between surfaces 29 and pipe 10 to insure flush engagement between them and to prevent abrasion between the surfaces and pipe. The shims also provide the added feature of inhibiting heat transfer from the pipe to the feet.

Grooves 31 are formed along the feet 28 in transverse spaced relation across the surfaces 29. The grooves are arranged parallel to the axis of the pipe to allow slight bending of each foot to accomodate variations and further insure intimate contact between their surfaces and the pipe.

The first nonextensible tensile member, as shown in FIGS. 1 and 3, is simply comprised of an elongated bolt shank 34 with threaded ends 35 received within apertures 36 through the rearward beam ends 19. The threaded ends 35 receive nuts 37 which may be selectively tightened against spherical washers 38. the washers 38 press against the beam surfaces 26 to urge the beams against the pipe 10.

The spherical washers 38 are identical and are used in pairs for the first and second nonextensible tensile members 18 and 20. Two of the washers are illustrated in detail in FIG. 3. Each includes a substantially cylindrical portion having a concave washer seat 39 therein for receiving a semi-spherical "ball" 40. The balls 40 are apertured to receive the shanks of the first and second tensile members. Balls 40 will freely pivot within the washer sets 39 to maintain the shanks in proper relation to the beam members and thereby avoid bending stresses along their lengths. Pure tensile stress is therefore applied to the tensile members.

The second nonextensible tensile member 20 includes a split bolt shank, having two shortened bolt shank sections 43. The shanks 43 are coaxial and extend from ends 44 outwardly from the strain sensing means 21. The shanks 43 also include threaded ends 45 and extend through appropriate apertures 46 in the beam ends 23. The threaded ends 45 receive nuts 47. The nuts 47 can be tightened against the spherical washers 38 to pull the forward beam ends together and apply clamping pressure to the beams against the pipe.

Figure 4:
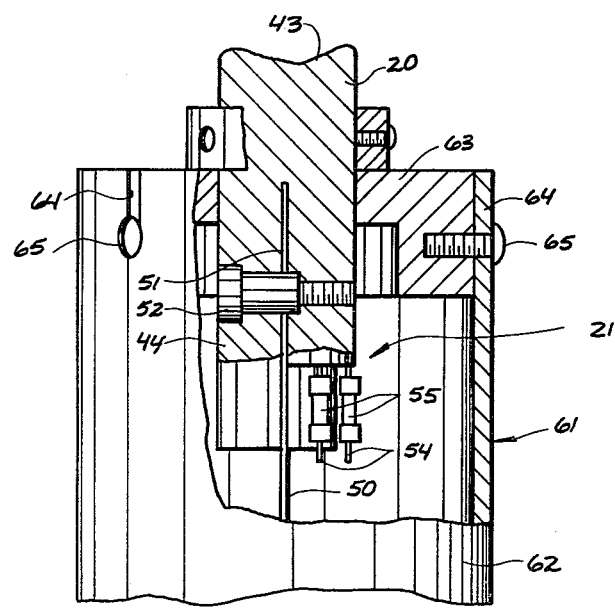
FIG. 4 is an enlarged fragmentary view illustrating a portion of the strain sensing means.

The strain means 21 includes a strain gauge plate 50. Plate 50 is preferably formed of relatively thin stainless steel having opposed ends releasably received within slots 51 (FIG. 4) formed in the bolt shanks 43. Cap screws 52 (FIG. 4) releasably secure the opposed ends of the strain gauge plate in place within the slots.

The stain gauge plate 50 includes a cross-sectional thickness that is substantially less than the cross-sectional diameter of the bolt shanks 43. The strain gauge plate 50 will therefore experience substantially more strain under tensile stress than will the bolt shanks 43 or the bolt shank 34 on the opposite side of the pipe.

In order to measure the strain experienced along the length of gauge plate 50, at least one, and preferably four, strain gauges 53 are attached to the plate surfaces, The gauges are of the conventional electrically resistive type having wire leads 54 leading to individual terminals 55. Terminals 55 provide connection of the strain gauges to appropriate measuring and indicating devices (not shown). Four of the terminals 55 are situated on one side of the plate while the remaining four are located on the opposite side (FIG. 3).

It is preferred to mount the strain gauge 53 in the manner shown in FIG. 2. Two strain gauges are oriented at right angles to one another. One gauge is aligned with the axis of the shafts 43 and the other is perpendicular to the axis. Two other gauges are similarly arranged on the back side of the plate. The gauges 53 are connected in the usual Wheatstone bridge arrangement for the purpose of detecting small strain variations along the length of the plate.

The entire strain sensing means 21 is selectively covered by a locking means 61. Locking means 61 is provided for transmitting torsion directly between the bolt shanks 43 while allowing tension applied along the bolt shanks 43 to be transmitted directly to the strain gauge plate 50.

The locking means 61 includes a tubular shield 62 that is preferably formed in two interfitting axial halves. The shield 62 is mounted to flanges 63 on the shanks 43. Slots 64 are provided in the opposite ends of the shield 62 to receive set screws 65. The set screws threadably engage the flanges 63 and can be selectively tightened to secure the shield to the flanges. This may be done to protect the strain gauge plate and strain gauges during assembly and disassembly of the device.

The screws 65 may be loosened to allow relatively free axial movement of the shield over the flanges in response to tension applied between the bolt shanks 43. However, any torsional movement will bring the walls of the slots into abutment with the screw shanks. The torsional forces will therefore be transferred through the shield directly from one bolt shank 43 to the other.

The present device is mounted to pipe 10 by first situating one of the rigid beams 17 along the top surface of the pipe with the foot thereof pressing a shim against the engaged surface of the pipe. The first and second tensile members 18 and 20 are then inserted through the apertures in the beams and through the spherical washers. The nuts 37 and 47 are then threaded onto the exposed shank ends.

The second shim is placed over the shoe of the remaining beam which is then lifted to engage the pipe directly below the upward beam. As this is being done, the free ends of the tensile members 18 and 20 are fitted through the apertures 36 and 46. The second set of spherical washers are then slid into place over the exposed ends of the tensile members and the second set of nuts are threaded onto the shanks. The bottom nuts secure the washers to the beam member and suspend the lower beam member from the upward member.

The tubular shroud 62 may then be removed to allow access to the terminals 55 for connection to appropriate readout mechanisms. For example, the strain gauges may be connected to a strain indicator placed in a full (Wheatstone) bridge mode. The initial sensor balance rating is noted while the lower arm weight is suspended by the tensile members. The strain indicator may then be observed to measure the proper preload stress. The prestressing is done by selectively tightening the nuts 37 and 47.

Initial tightening of the nuts 37 and 47 is preferably done with the tubular shroud removed until a strain reading of approximately 500 microinches per inch has been obtained on the strain indicator. The cap screws can then be backed off slightly and retightened to assure proper alignment and seating of the cap screws against the strain gauge plate 50. The shield 62 is then replaced with one end of the shroud being secured rigidly to the adjacent flange and with the remaining end having its set screws loosely positioned for the purpose of transmitting torsion between the shanks 43. The nuts on the first and second tensile members can then be tightened until the sensor readout increases to a prescribed value, say a total of 2500 microinches per inch.

To assure proper positioning of the device on the pipe during this initial preloading, it is generally advisable to lightly tap the upper beam directly over the adjacent shoe with a leather or rubber hammer, repeating the process with the lower beam and with the pipe on each side of the shoes. The vibrations cause the shoes to settle firmly into place and assure proper relative positioning of the first and second tensile members. The device is then ready for use.

The prestressing of the device against the pipe produces a known strain value for the strain indicator. Therefore, both upward and downward pressure fluctuations can be measured. For a pressure "dip", the strain indicator will indicate a load value less than the preload value earlier placed on the device. Positive pressure fluctuations will, of course, produce an indication of strain above the prestress value. The measured strain can then be related directly to pressure fluctuations within the pipe 10, the correlation of which may be produced continuously through appropriate instrumentation.

Very slight pressure fluctuations within the pipe are magnified due to the remote position of the strain gauges from the pipe surface and also due to the thickness and elasticity of the strain gauge plate. Furthermore, the strain gauges measure total diametral pipe dilation. The resulting strain on the gauge plate is therefore substantially greater than the strain produced on a small segment of the pipe circumference as previously accomplished with strain gauges welded or otherwise affixed to the pipe circumference.

With the present device, pressure variations of 3 psi are readily measurable, producing a wall strain in an 8 inch pipe of 1.27 microinches per inch of circumferential wall strain.

The above description and attached drawings are given by way of example to set forth a preferred form of the present invention. The scope of the invention, however, is more precisely defined in the attached claims.

What I claim is:
1. An apparatus for measuring diametral dilation of cylindrical pipe, comprising:
   first and second rigid beams each having front and back ends spaced apart a distance greater than the exterior pipe diameter, said beams being adapted to engage the pipe intermediate their respective ends at opposite sides of the pipe with the corresponding front and back ends of the beams overlying one another and located outwardly from the pipe;
   first nonextensible tensile means for tying the back ends of said beams to one another;
   strain sensing means having first and second opposed ends;
   second nonextensible tensile means fixed to and extending outward from the first and second opposed ends of said strain sensing means for tying the front ends of said beams to one another in opposition to said first tensile means;
   said first and second tensile means being prestressed to preload the strain sensing means.

2. The apparatus as defined by claim 1 wherein each beam includes a rigid foot with a transverse inner surface complementary to the exterior pipe transverse surface configuration and adapted to engage the pipe in surface-to-surface contact with the beam arranged transverse to the pipe axis.

3. The apparatus as defined by claim 2 further comprising a shim of heat insulative material adapted to be interposed between the pipe and the foot of each beam.

4. The apparatus as defined by claim 3 wherein the first and second nonextensible tensile means are comprised of nut and bolt assemblies with threaded shanks loosely received through upright apertures formed through the rigid beams at their front and back ends.

5. The apparatus as defined by claim 4 wherein the nut and bolt assemblies include spherical washers and spherical washer seats mountable to the shanks and held against the beams by nuts threaded on the shanks.

6. The apparatus as defined by claim 1 wherein the strain sensing means is comprised of a strain gauge plate with at least one electrically resistive strain gauge affixed thereto.

7. The apparatus as defined by claim 6 wherein the strain gauge plate is releasably mounted to the second non-extensible tensile member.

8. The apparatus as defined by claim 6 further comprising lock means for transmitting torsional forces through the second nonextensible tensile means, bypassing the strain gauge plate while permitting loading of the strain gauge plate in tension responsive to dilation of the pipe.

9. The apparatus as defined by claim 8 wherein the strain gauge plate is releasably mounted to the second nonextensible tensile member.

10. The apparatus as defined by claim 1 wherein the first and second nonextensible tensile means include elongated bolt shanks, threaded to receive nuts at opposite ends thereof; and wherein the first and second rigid beams are apertured to loosely receive the threaded ends of the bolt shanks.

11. The apparatus as defined by claim 10 wherein the strain sensing means includes an elongated strain gauge plate and wherein the second nonextensible means includes a pair of bolt shanks releasably interconnected by the strain gauge plate.

12. The apparatus as defined by claim 11 wherein the strain gauge plate includes a cross-sectional thickness dimension less than the cross-sectional diameters of the pair of bolt shanks.

13. The apparatus as defined by claim 10 further comprising spherical washers received over the threaded bolt shanks on outwardly facing sides of the rigid beams to be clamped between the beams and nuts threaded onto the shanks.

14. The apparatus as defined by claim 1 wherein each beam includes a rigid foot with an arcuate surface thereon complementary to the cross-sectional curvature of the cylindrical pipe, the arcuate surface having elongated grooves extending parallel to the axis of the cylindrical pipe.

15. The apparatus as defined by claim 1 wherein:
   the strain sensing means is comprised of a strain gauge plate fastened to the second nonextensible tensile means and electrical resistance strain gauge fixed to the strain gauge plate;
   wherein the strain gauge and strain gauge plate are enshrouded by a tubular shield, and further comprising:
   lock means interconnecting the tubular shield to the second nonextensible tensile means for permitting direct transmittal of strain to the strain gauge plate while transmitting torsion directly through the second nonextensible means, bypassing the strain gauge plate.

* * * * *